US012517367B2

United States Patent
Seo et al.

(10) Patent No.: US 12,517,367 B2
(45) Date of Patent: Jan. 6, 2026

(54) SEE-THROUGH DISPLAY DEVICE AND AUGMENTED REALITY DEVICE INCLUDING THE SAME

(71) Applicants: SAMSUNG ELECTRONICS CO., LTD., Suwon-si (KR); MYONGJI UNIVERSITY INDUSTRY AND ACADEMIA COOPERATION, Yongin-si (KR)

(72) Inventors: Wontaek Seo, Yongin-si (KR); Woojun Han, Seoul (KR); Daeho Yang, Suwon-si (KR); Jaisoon Kim, Anyang-si (KR); Seunga Lim, Incheon (KR)

(73) Assignees: SAMSUNG ELECTRONICS CO., LTD., Suwon-si (KR); MYONGJI UNIVERSITY INDUSTRY AND ACADEMIA COOPERATION, Yongin-si (KR)

( * ) Notice: Subject to any disclaimer, the term of this patent is extended or adjusted under 35 U.S.C. 154(b) by 960 days.

(21) Appl. No.: 17/702,453

(22) Filed: Mar. 23, 2022

(65) Prior Publication Data

US 2023/0103120 A1 Mar. 30, 2023

(30) Foreign Application Priority Data

Sep. 24, 2021 (KR) ........................ 10-2021-0126712

(51) Int. Cl.
*G02B 27/01* (2006.01)
(52) U.S. Cl.
CPC ..... *G02B 27/0179* (2013.01); *G02B 27/0172* (2013.01); *G02B 2027/013* (2013.01);
(Continued)

(58) Field of Classification Search
CPC ............ G02B 27/0025; G02B 27/0093; G02B 27/0172; G02B 27/0179; G02B 2027/011;
(Continued)

(56) References Cited

U.S. PATENT DOCUMENTS

| 5,793,339 A * | 8/1998 | Takahashi | .............. G02B 17/08 |
| | | | 348/E13.041 |
| 9,057,826 B2 * | 6/2015 | Gupta | ..................... G02C 7/086 |
| (Continued) | | | |

FOREIGN PATENT DOCUMENTS

| KR | 10-2018-0084557 A | 7/2018 |
| KR | 10-2019-0110495 A | 9/2019 |
| (Continued) | | |

OTHER PUBLICATIONS

Bongsu Shin et al., "Compact augmented-reality glasses using holographic optical element combiner", Proceedings of SPIE, vol. 10944, Mar. 1, 2019, 8 pages, doi: 10.1117/12.2507339.
(Continued)

*Primary Examiner* — Jennifer D. Carruth
(74) *Attorney, Agent, or Firm* — Sughrue Mion, PLLC

(57) ABSTRACT

A see-through display device includes an image generator configured to emit image light, a combiner which is arranged off-axis with respect to the image light and is configured to generate an off-axis aberration with respect to the image light, and a free-form optical element which is disposed on an optical path of the image light between the image generator and the combiner and is configured to generate a correction aberration with respect to the image light, the correction aberration being opposite to the off-axis aberration.

18 Claims, 15 Drawing Sheets

(52) U.S. Cl.
CPC ............... *G02B 2027/0174* (2013.01); *G02B 2027/0187* (2013.01)

(58) Field of Classification Search
CPC ...... G02B 2027/013; G02B 2027/0174; G02B 2027/0187
USPC ........................................................ 359/630
See application file for complete search history.

(56) References Cited

U.S. PATENT DOCUMENTS

| | | | |
|---|---|---|---|
| 10,394,036 B2* | 8/2019 | Hua ..................... | G02B 27/106 |
| 11,624,912 B2* | 4/2023 | Rolland ............. | G02B 27/0176 |
| | | | 359/633 |
| 2007/0236800 A1* | 10/2007 | Cakmakci .......... | G02B 27/0172 |
| | | | 359/630 |
| 2011/0075257 A1* | 3/2011 | Hua ................... | G02B 27/0172 |
| | | | 359/464 |
| 2012/0162549 A1 | 6/2012 | Gao et al. | |
| 2014/0211322 A1* | 7/2014 | Bohn ................. | G02B 27/0081 |
| | | | 359/633 |
| 2014/0361957 A1 | 12/2014 | Hua et al. | |
| 2014/0375789 A1 | 12/2014 | Lou et al. | |
| 2015/0168802 A1 | 6/2015 | Bohn | |
| 2020/0088998 A1* | 3/2020 | Shin ................... | G02B 27/0172 |
| 2021/0333548 A1 | 10/2021 | Hwang et al. | |
| 2023/0134565 A1 | 5/2023 | Seo et al. | |

FOREIGN PATENT DOCUMENTS

| | | |
|---|---|---|
| WO | 2013/112705 A1 | 8/2013 |
| WO | 2019/040484 A1 | 2/2019 |

OTHER PUBLICATIONS

Wontaek Seo et al., "Compact holographic display for augmented reality glasses", SAIT Conference, Multimedia Processing Lab, SAIT, 2021, 4 pages.

Alessandro Evangelista et al. "Unveiling the technological trends of augmented reality: A patent analysis", Computers in Industry, vol. 118, 103221, 2020, 15 pages, https://doi.org/10.1016/j.compind.2020.103221.

Https://www.grandviewresearch.com/industry-analysis/augmentedreality-market, 2021, 11 pages.

Https://www.microsoft.com/en-us/hololens/hardware, 2021, 7 pages.

Https://www.magicleap.com/magic-leap-one, 2021, 22 pages.

Bernard Kress et al. "The segmentation of the HMD market: optics for smart glasses, smart eyewear, AR and VR headsets", SPIE Optical Engineering + Applications, 2014, 15 pages, doi: 10.1117/12.2064351.

Bernard Kress, "Digital optical elements and technologies (ED019): applications to AR/VR/MR", SPIE Digital Optical Technologies, 2019, 14 pages, doi: 10.1117/12.2544404.

Tao Zhan et al., "Augmented reality and Virtual Reality Displays: Perspectives and Challenges", iScience 23, 101397, Aug. 21, 2020, 13 pages, DOI: 10.1016/j.isci.2020.101397.

Https://kguttag.com/category/near-eye-augmented-reality/, 2021, 10 pages.

David M. Hoffman et al., "Vergence-accommodation conflicts hinder visual performance and cause visual fatigue", Journal of Vision, 2008, 8(3):33, pp. 1-30.

Gregory Kramida, "Resolving the Vergence-Accommodation Conflict in Head-Mounted Displays", IEEE Transactions on Visualization and Computer Graphics, vol. 22, No. 7, Jul. 2016, 20 pages.

Ashley Carman, "North Focals glasses review: a $600 smartwatch for your face", https://www.theverge.com/2019/2/14/18223593/focals-smartglasses-north-review-specs-features-price, Feb. 14, 2019, 10 pages.

Bosch Sensortec GmbH, "More than meets the eye: Bosch enables the next generation of smartglasses", https://www.boschsensortec.com/news/smartglasses.html, 2021, 6 pages.

Mareddi Bharath Kumar et al., "Compact vari-focal augmented reality display based on ultrathin, polarization-insensitive, and adaptive liquid crystal lens", Optics and Lasers in Engineering, 128, Jan. 2020, 13 pages.

Yu-Jen Wang et al., "Varifocal augmented reality adopting electrically tunable uniaxial plane-parallel plates", Optics Express, vol. 28, No. 15. Jul. 20, 2020, pp. 23023-23036.

Kaan Aksit et al., "Near-eye varifocal augmented reality display using See-Through Screens", ACM Transactions on Graphics, vol. 36, No. 6, Article 1, Nov. 2017, 13 pages.

Michael Sattler, "What you need to know about Magic Leap One", Digitalisation & Disruption, https://www.zuehlke.com/en/insights/what-you-need-to-know-aboutmagic-leap-one#, Feb. 6, 2021, 9 pages.

Jungkwuen An et al., "Slim-panel holographic video display", Nature Communications, pp. 1-7, Nov. 10, 2020, https://doi.org/10.1038/s41467-020-19298-4.

Nam Kim et al., "Holographic optical elements and application", ResearchGate, Holographic Materials and Optical Systems, InTech, Mar. 22, 2017. Crossref, 36 pages, doi:10.5772/67297.

\* cited by examiner

SEE-THROUGH DISPLAY DEVICE AND AUGMENTED REALITY DEVICE INCLUDING THE SAME

CROSS-REFERENCE TO RELATED APPLICATION

This application is based on and claims priority under 35 U.S.C. § 119 to Korean Patent Application No. 10-2021-0126712, filed on Sep. 24, 2021, in the Korean Intellectual Property Office, the disclosure of which is incorporated by reference herein in its entirety.

BACKGROUND

1. Field

The disclosure relates to a see-through display device and an augmented reality device including the same.

2. Description of the Related Art

Recently, as electronic devices and display devices capable of realizing virtual reality (VR) have been developed, interest in VR has increased. As a next step of VR, technologies and methods that may realize augmented reality (AR) and mixed reality (MR) have also been studied.

Unlike VR that assumes a complete virtual world, AR is a display technique that further increases an effect of reality by overlapping (combining) virtual objects or information on an environment of the real world. Considering that VR is limitedly applicable to fields such as games or virtual experience, AR may be applicable to various real environments. In particular, AR is drawing attention as a next generation display technique suitable for a ubiquitous environment or an Internet-of-Things (IoT) environment. AR may be an example of MR in that AR mixes the real world and additional information such as virtual world information.

AR devices for implementing AR require a combiner for allowing a viewer to simultaneously view an image generated by a certain signal and an external scene. Known examples of such combiners include a beam splitter (BS) and a holographic optical element (HOE).

When using, as a combiner, a structure in which a BS and an optical system including a lens and a mirror are coupled to each other, the volume of the BS and the optical system may increase as a viewing angle increases. Research has been recently conducted on the use of an HOE as a combiner for implementing complex optical characteristics in a simpler structure.

The combiner using an HOE is configured to perform a function of a concave mirror to implement a Maxwellian view scheme. In other words, the HOE forms an image at a focal point corresponding to the position of the pupil of an eye. In this case, a viewer may view an image clearly only when the viewer's eyes are accurately at the focal point having a significantly small size, and thus, an eye box, through which the view may view an image, may be significantly narrow.

SUMMARY

According to various example embodiments of the disclosure, provided are a see-through display device including a configuration for minimizing off-axis aberration that may be generated by a combiner and satisfying a Scheimpflug condition, and an augmented reality device including the see-through display device.

Additional aspects will be set forth in part in the description which follows and, in part, will be apparent from the description, or may be learned by practice of the presented embodiments of the disclosure.

According to an aspect of the disclosure, there is provided a see-through display device including: an image generator configured to emit light corresponding to an image; a combiner arranged off-axis with respect to the light corresponding to the image; and a free-form optical element provided on an optical path of the light corresponding to the image between the image generator and the combiner, the free-form optical element configured to generate a correction aberration with respect to the light corresponding to the image, the correction aberration being opposite to an off-axis aberration generated by the combiner.

The free-form optical element may be further configured to generate the correction aberration to offset the off-axis aberration generated by the combiner.

The free-form optical element may be further configured to generate an intermediate image based on light corresponding to the image within a range from the combiner to a focal length of the combiner.

The free-form optical element may include a curved surface represented by at least one coefficient of Legendre polynomials, extended polynomials, Chebyshev polynomials, Q-polynomials, and Zernike polynomials.

The free-form optical element may include: a first free-form optical element configured to pass through the light corresponding to the image from the image generator, and a second free-form optical element pass through the light corresponding to the image that passed through the first free-form optical element, and wherein the correction aberration is generated by a combination of the first free-form optical element and the second free-form optical element.

The combiner may include a holographic optical element (HOE), and is further configured to focus the light corresponding to the image.

The combiner may include a diffractive optical element (DOE), and is further configured to focus the light corresponding to the image.

The image generator may include a light source, a beam splitter configured to transmit a part of light from the light source and reflect another part of the light, a spatial light modulator configured to modulate the light emitted from the light source and reflected by the beam splitter to generate the light corresponding to the image, and a collimating lens which is disposed on an optical path, between the spatial light modulator and the beam splitter, of the light corresponding to the image from the spatial light modulator and is configured to convert the light emitted from the light source into parallel light.

The collimating lens and the beam splitter may be configured to converge the light corresponding to the image from the spatial light modulator to any one point.

The see-through display device may further include an aperture which is at the one point to which the light corresponding to the image converges and is configured to filter the light corresponding to the image.

The see-through display device may further include a rotatable mirror which is disposed between the image generator and the combiner and is configured to rotate to variously change a traveling direction of the light corresponding to the image from the image generator to the combiner.

The rotatable mirror may be disposed on an optical path of the light corresponding to the image between the image generator and the free-form optical element.

The rotatable mirror may be disposed on an optical path of the light corresponding to the image between the free-form optical element and the combiner.

The free-form optical element may include a first free-form optical element through which the light corresponding to the image from the image generator passes, and a second free-form optical element through which the light corresponding to the image that passed through the first free-form optical element passes, wherein the correction aberration is generated by a combination of the first free-form optical element and the second free-form optical element, and the rotatable mirror is disposed on an optical path of the light corresponding to the image between the first free-form optical element and the second free-form optical element.

The see-through display device may further include at least one fixed mirror which is disposed between the image generator and the combiner and is configured to change an optical path of the light corresponding to the image such that the light corresponding to the image from the image generator travels toward the combiner.

The see-through display device may further include a polarization plate which is disposed on the combiner and is configured to reflect light of a first polarization and absorb or transmit light of a second polarization which is different from the first polarization.

According to an aspect of the disclosure, there is provided an augmented reality device including: a body; a first leg part provided at a left end of the body and a second leg part provided at a right end of the body; a first combiner provided at a left front surface and a second combiner provided at a right front surface of the body; and a first image generation device and a second image generation device configured to provide light corresponding to image to the first combiner and the second combiner, respectively, wherein each of the first image generation device and the second image generation device includes: an image generator configured to emit the light corresponding to the image; and a free-form optical element provided on an optical path of the image light between the image generator and the first combiner or the second combiner, wherein the first combiner and the second combiner are arranged off-axis with respect to the light corresponding to the image, and wherein the free-form optical element is configured to generate a correction aberration with respect to the light corresponding to the image, the correction aberration being opposite to an off-axis aberration generated by the combiner.

The free-form optical element may be further configured to generate the correction aberration by the free-form optical element and the off-axis aberration generated by the first combiner and the second combiner offset.

The free-form optical element is may be further configured to generate an intermediate image based on the light corresponding to the image within a range from the combiner to a focal length of the combiner.

The free-form optical element may include a curved surface represented by at least one coefficient of Legendre polynomials, extended polynomials, Chebyshev polynomials, Q-polynomials, and Zernike polynomials.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
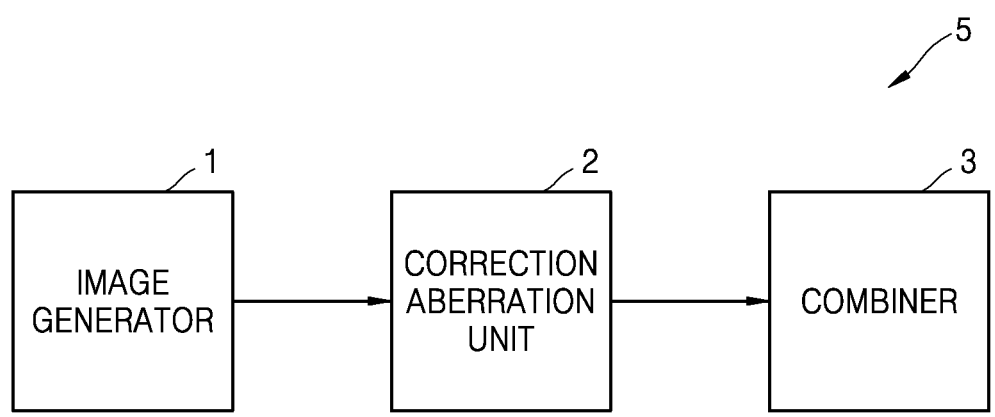
FIG. 1 is a conceptual view of a see-through display device, according to various example embodiments.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the drawings, the size or thickness of each element may be exaggerated for clarity and convenience of description.

Although the terms such as "first" or "second" may be used herein to describe various elements, these elements should not be limited by these terms. These terms are only used to distinguish one element from another element.

Hereinafter, an expression "on" used herein may include not only "immediately on in a contact manner" but also "on in a non-contact manner". The singular expression also includes the plural meaning as long as it is not inconsistent with the context.

Throughout the specification, when an element is referred to as "including" a component, the element may additionally include other components rather than excluding other components as long as there is no particular opposing recitation.

The term "the" and other demonstratives similar thereto should be understood to include a singular form and plural forms.

FIG. 1 is a conceptual view of a see-through display device 5, according to various example embodiments.

Referring to FIG. 1, the see-through display device 5 may include an image generator 1, a correction aberration generation unit 2, and a combiner 3. The image generator 1 may provide image light to the correction aberration generation unit 2. The image light may include image information. The image generator 1 may include a spatial light modulator (SLM). For example, the image generator 1 may include a liquid crystal on silicon (LCoS) display. The image generator 1 may include pixels. The image light may be a combination of rays of light emitted from the pixels. The rays of light emitted from the pixels may have different phases. Accordingly, the image light may include the image information.

The correction aberration generation unit 2 may generate a correction aberration in the image light. For example, the correction aberration may include astigmatism and a chromatic aberration. The correction aberration may be opposite to an off-axis aberration generated by the combiner 3. The off-axis aberration may be generated as the combiner 3 is arranged off-axis with respect to the image light. For example, the off-axis aberration may include astigmatism and a chromatic aberration. In the case where the correction aberration generation unit 2 is not provided in the see-through display device 5, the image light having been emitted from the image generator 1 and reflected by the combiner 3 may have an off-axis aberration. The correction aberration generation unit 2 may generate a correction aberration, which is opposite to the off-axis aberration of the image light, to reduce a final aberration of the image light.

According to various example embodiments of the disclosure, the correction aberration generation unit 2 may include a free-form optical element. For example, the correction aberration generation unit 2 may include a free-form lens including a curved surface designed to generate a correction aberration with respect to image light. The correction aberration generation unit 2 may provide the image light having the correction aberration to the combiner 3.

The combiner 3 may diffract and reflect the image light. For example, the combiner 3 may include a holographic optical element (HOE). However, the disclosure is not limited thereto, and the combiner 3 may include a diffractive optical element (DOE). The combiner 3 may perform a function of a concave mirror with respect to the image light. The combiner 3 may focus the image light. The combiner 3 may couple the image light with external light. The external light may be light incident on the combiner 3 from the outside of the see-through display device 5. The combiner 3 may be arranged off-axis with respect to the image light. An off-axis aberration generated in the image light by the combiner 3 may be mitigated by a correction aberration.

Figure 2:
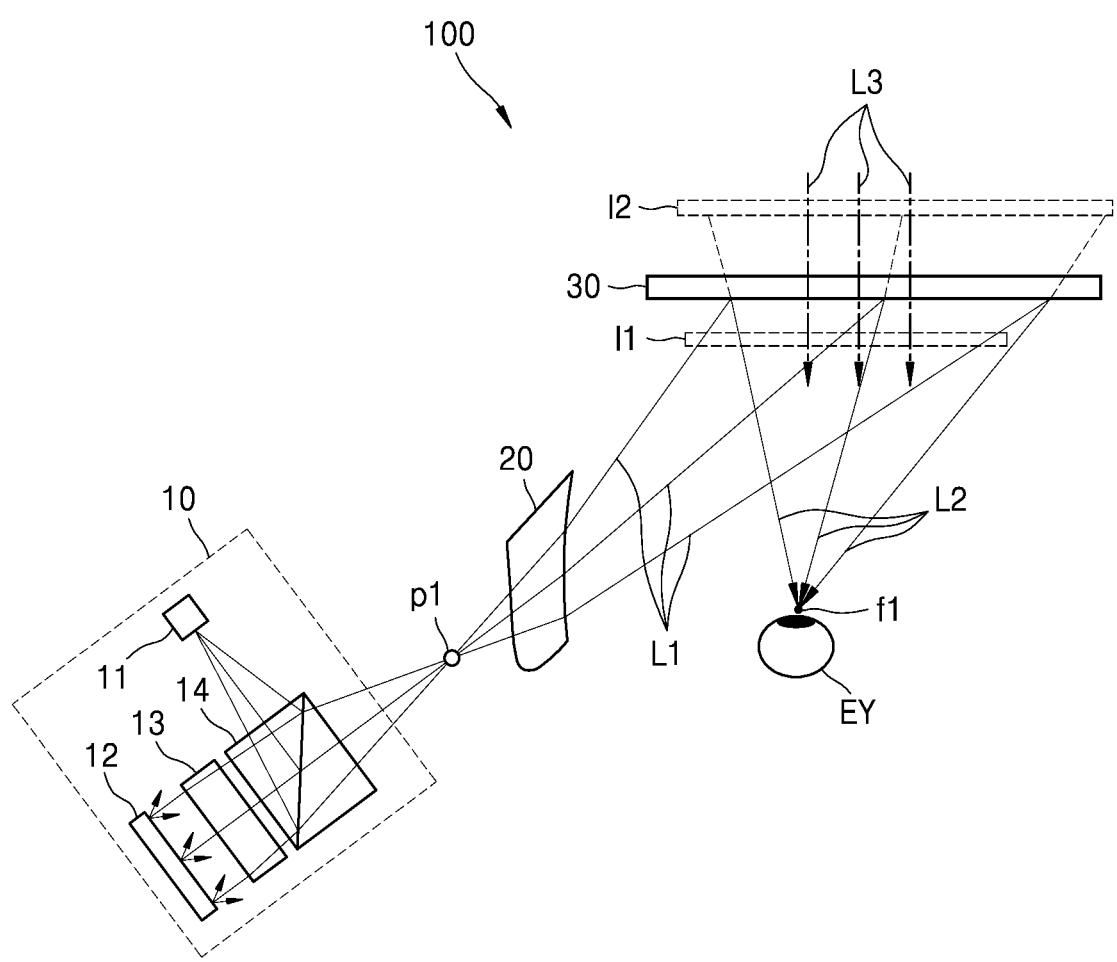
FIG. 2 is a diagram schematically illustrating an example configuration of a see-through display device, according to an example embodiment.

FIG. 2 is a diagram schematically illustrating an example configuration of a see-through display device 100, according to an example embodiment.

Referring to FIG. 2, the see-through display device 100 may include an image generator 10 configured to emit image light, a combiner 30, which is arranged off-axis with respect to the image light and is configured to generate an off-axis aberration with respect to the image light, and a free-form optical element 20, which is disposed on an optical path of the image light between the image generator 10 and the combiner 30 and is configured to generate a correction aberration opposite to the off-axis aberration with respect to the image light.

The image generator 10 may include a light source 11, a spatial light modulator (SLM) 12, a collimating lens 13, and a beam splitter 14. The SLM 12, the collimating lens 13, and the beam splitter 14 may be sequentially arranged on a straight line. The light source 11 may be at one side of the beam splitter 14. Accordingly, light emitted from the light source 11 may be incident on the one side of the beam splitter 14.

The beam splitter 14 may be disposed on an optical path of the light emitted from the light source 11 to transmit a part of the light emitted from the light source 11 and reflect another part of the light. The SLM 12 may modulate light emitted from the light source 11 and reflected by the beam splitter 14 to generate image light. The collimating lens 13 may be disposed on an optical path of the image light from the SLM 12 between the SLM 12 and the beam splitter 14 to convert the light emitted from the light source into parallel light.

The light source 11 may include a light-emitting diode (LED) that emits white light. However, the disclosure is not limited thereto, and the light source 11 may include a laser diode that emits laser light. In the case where the light source 11 includes a laser diode, light emitted from the light source 11 may have coherence. Meanwhile, the light source 11 may emit monochromatic light of a visible region. For example, the light source 11 may be an optical element (e.g., an LED) which emits any one of red light, green light, and blue light.

Furthermore, the light source 11 may include a plurality of optical elements including a first optical element emitting red light, a second optical element emitting green light, and a third optical element emitting blue light. The first, second, and third optical elements that emit light of different wavelengths included in the light source 11 may be independently driven with time differences among them. Accordingly, the red light, the green light, and the blue light may be sequentially emitted from the light source 11.

The SLM 12 may modulate the light emitted from the light source 11 and reflected by the beam splitter 14 to generate the image light including image information. For example, the SLM 12 may include one of an LCoS display panel and a liquid crystal display (LCD) panel. For example, when the SLM 12 includes an LCoS display panel or an LCD panel, the image light including the image information and generated by the SLM 12 may be light of a first polarization. For example, the first polarization may be horizontal polarization (P polarization). However, the disclosure is not limited thereto, and the first polarization may be vertical polarization (S polarization).

The image light may be reflected from the SLM 12 in various directions. For example, the image light emitted from one pixel of the SLM 12 may travel in various directions. Also, the SLM 12 may generate a computer-generated hologram (CGH). In this case, light from the light source 11 may include image information by the CGH generated by the SLM 12.

The collimating lens 13 may be disposed on the optical path of the image light between the SLM 12 and the beam splitter 14, may convert the light emitted from the light source 11 into parallel light, and also focus the image light generated by the SLM 12. The image light focused by the collimating lens 13 may travel toward the beam splitter 14.

The beam splitter 14 may be disposed on the optical path of the light emitted from the light source 11, between the light source 11 and the SLM 12. The beam splitter 14 may include a polarization beam splitter (PBS) that transmits or reflects light according to the type of polarization. The beam splitter 14 may include an incident surface that is inclined at a preset angle with respect to the optical path of the light emitted from the light source 11. At least a part of the incident light from the light source 11 may be reflected by the incident surface, and then travel toward the SLM 12. For example, the incident surface of the beam splitter 14 may reflect light of a vertical polarization (S polarization) and transmit light of a horizontal polarization (P polarization). Accordingly, the light reflected by the incident surface of the beam splitter 14 and directed to the SLM 12 may be light of a vertical polarization (S polarization) included in the light emitted from the light source 11. When the SLM 12 includes an LCoS display panel, the light of the vertical polarization (S polarization) arriving at the SLM 12 may be reflected by the SLM 12 and converted into light of a horizontal polarization (P polarization). The light of the horizontal polarization (P polarization) from the SLM 12 may pass through the incident surface of the beam splitter 14 after passing through the collimating lens 13.

As described above, the image light generated by the SLM 12 may sequentially pass through the collimating lens 13 and the beam splitter 14. The collimating lens 13 and the beam splitter 14 may be configured to converge, to any one point, the image light from the SLM 12. As illustrated in FIG. 2, the image light that passed through the collimating lens 13 and the beam splitter 14 may converge to an arbitrary convergence point p1 in front of the beam splitter 14. The image light may diverge from the convergence point p1 and travel toward the free-form optical element 20.

The free-form optical element 20 may include a curved surface, which is at the light incident surface or light exit surface thereof, and is specially designed to generate a correction aberration with respect to the image light. The free-form optical element 20 may be configured such that the correction aberration generated by the free-form optical element 20 offsets the off-axis aberration generated by the combiner 30. For example, the correction aberration may be generated in the image light that passed through the free-form optical element 20, and the off-axis aberration may be additionally generated in the light that passed through the free-form optical element 20 and been reflected by the combiner 30. In this case, the correction aberration and the off-axis aberration generated with respect to the image light offset each other, and thus the final aberration with respect to the image light may be minimized.

In addition, the free-form optical element 20 may be designed to satisfy a Scheimpflug condition. For example, the free-form optical element 20 may be configured such that an intermediate image I1 of the image light is generated within a range from the combiner 30 to a focal length of the combiner 30. The intermediate image I1 of the image light may be an image generated by the free-form optical element 20. For example, the intermediate image I1 of the image light may be an image of the image light that passed through the free-form optical element 20, at a position adjacent to the combiner 30. As described above, as the Scheimpflug condition is satisfied by the free-form optical element 20, a clear final image of the image light may be provided to an eye EY of a user.

The free-form optical element 20 may include a curved surface represented by at least one coefficient of Legendre polynomials, extended polynomials, Chebyshev polynomials, Q-polynomials, and Zernike polynomials. The free-form optical element 20 designed to have a curved surface represented by coefficients of various polynomials may generate the correction aberration with respect to the image light and satisfy the Scheimpflug condition with respect to the combiner 30.

The combiner 30 may provide the eye EY of the user with an external image of external light L3 and a virtual image of light L2 obtained by diffracting and then reflecting the image light L1 that passed through the free-form optical element 20. For example, the combiner 30 may include an HOE. The HOE included in the combiner 30 may function as a concave mirror. However, the disclosure is not limited thereto, and the combiner 30 may include a DOE.

The combiner 30 may focus image light. For example, the combiner 30 may focus, on a first focal point f1, the light L2 obtained by diffracting and then reflecting the image light L1 that passed through the free-form optical element 20.

The combiner 30 may be arranged off-axis with respect to the image light L1 that passed through the free-form optical element 20. Accordingly, the combiner 30 may generate an off-axis aberration with respect to the image light L1 that passed through the free-form optical element 20. The off-axis aberration generated in the image light by the combiner 30 may be mitigated by the correction aberration generated by the free-form optical element 20.

Meanwhile, the intermediate image I1 of the image light L1 that passed through the free-form optical element 20 may be generated within the focal length of the combiner 30. For example, the intermediate image I1 may be generated between the combiner 30 and the first focal point f1 of the combiner 30. The combiner 30 may function as a concave mirror, and may provide the user with an enlarged virtual image 12 corresponding to the intermediate image I1. For example, the combiner 30 may provide the eye EY of the user with the virtual image 12 by focusing, on the first focal point f1, the light L2 obtained by diffracting and then reflecting the image light L1 that passed through the free-form optical element 20.

Figure 3:
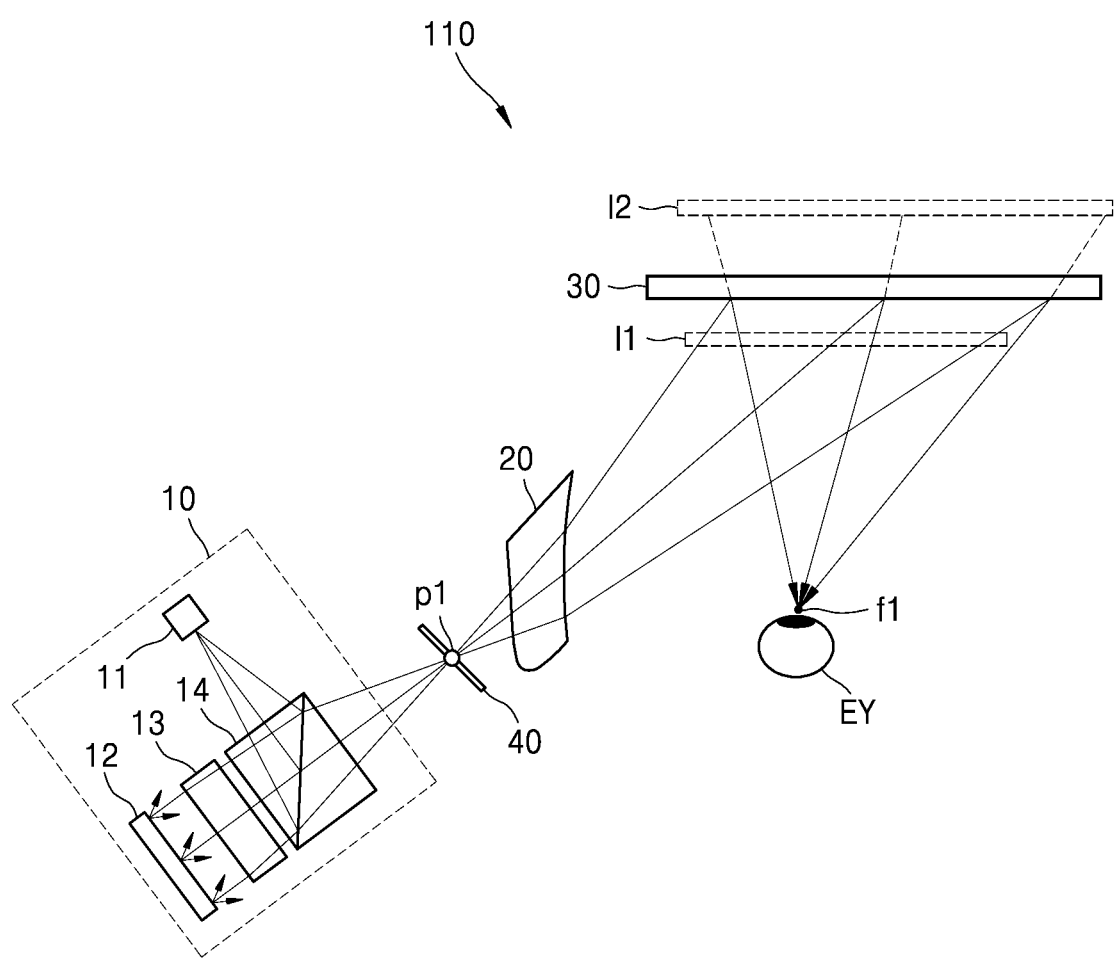
FIG. 3 is a diagram schematically illustrating an example configuration of a see-through display device, according to another example embodiment.
Figure 4:
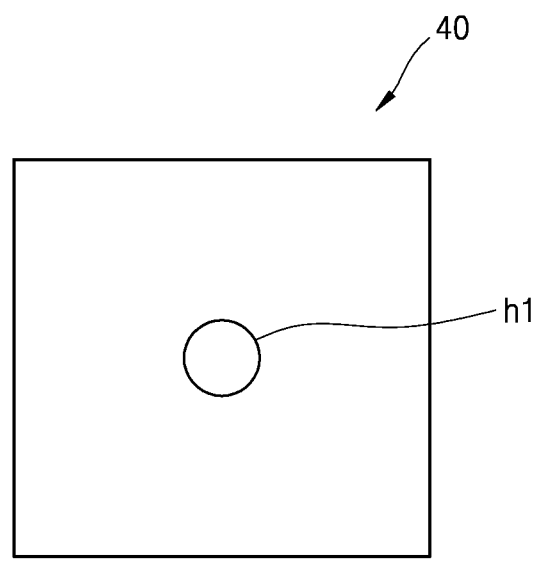
FIG. 4 is a diagram schematically illustrating an example configuration of an aperture included in the see-through display device of FIG. 3.

FIG. 3 is a diagram schematically illustrating an example configuration of a see-through display device 110, according to another example embodiment. FIG. 4 is a diagram schematically illustrating an example configuration of an aperture 40 included in the see-through display device 110 of FIG. 3. The see-through display device 110 of FIG. 3 may be substantially the same as the see-through display device 100 of FIG. 2, except that the see-through display device 110 further includes the aperture 40. In describing FIG. 3, descriptions that are provided in connection with FIG. 2 will be omitted.

Referring to FIG. 3, the see-through display device 110 may include the image generator 10 configured to emit image light, the combiner 30, which is arranged off-axis with respect to the image light and is configured to generate an off-axis aberration with respect to the image light, and the free-form optical element 20, which is disposed on an optical path of the image light between the image generator 10 and the combiner 30 and is configured to generate a correction aberration opposite to the off-axis aberration with respect to the image light.

The image generator 10 may include the light source 11, the SLM 12, the collimating lens 13, and the beam splitter 14.

The image light generated by the SLM 12 may sequentially pass through the collimating lens 13 and the beam splitter 14. The collimating lens 13 and the beam splitter 14 may be configured to converge, to at any one point, the image light from the SLM 12. As illustrated in FIG. 3, the image light that passed through the collimating lens 13 and the beam splitter 14 may converge to the arbitrary convergence point p1 in front of the beam splitter 14. The image light may diverge from the convergence point p1 and travel toward the free-form optical element 20.

In addition, the see-through display device 110 may further include the aperture 40 at the convergence point p1 to which the image light converges, to filter out a part of the image light. For example, referring to FIG. 4, the aperture 40 may include a hole h1 formed at the center thereof. The aperture 40 may be configured to perform a spatial filtering function with respect to image light. The aperture 40 may be configured such that the position of the hole h1 coincides with the optical path of the image light converged to the convergence point p1. Accordingly, the aperture 40 may transmit the image light converged to the convergence point p1, and may not transmit light corresponding to noise, which is not converged to the convergence point p1.

Figure 5:
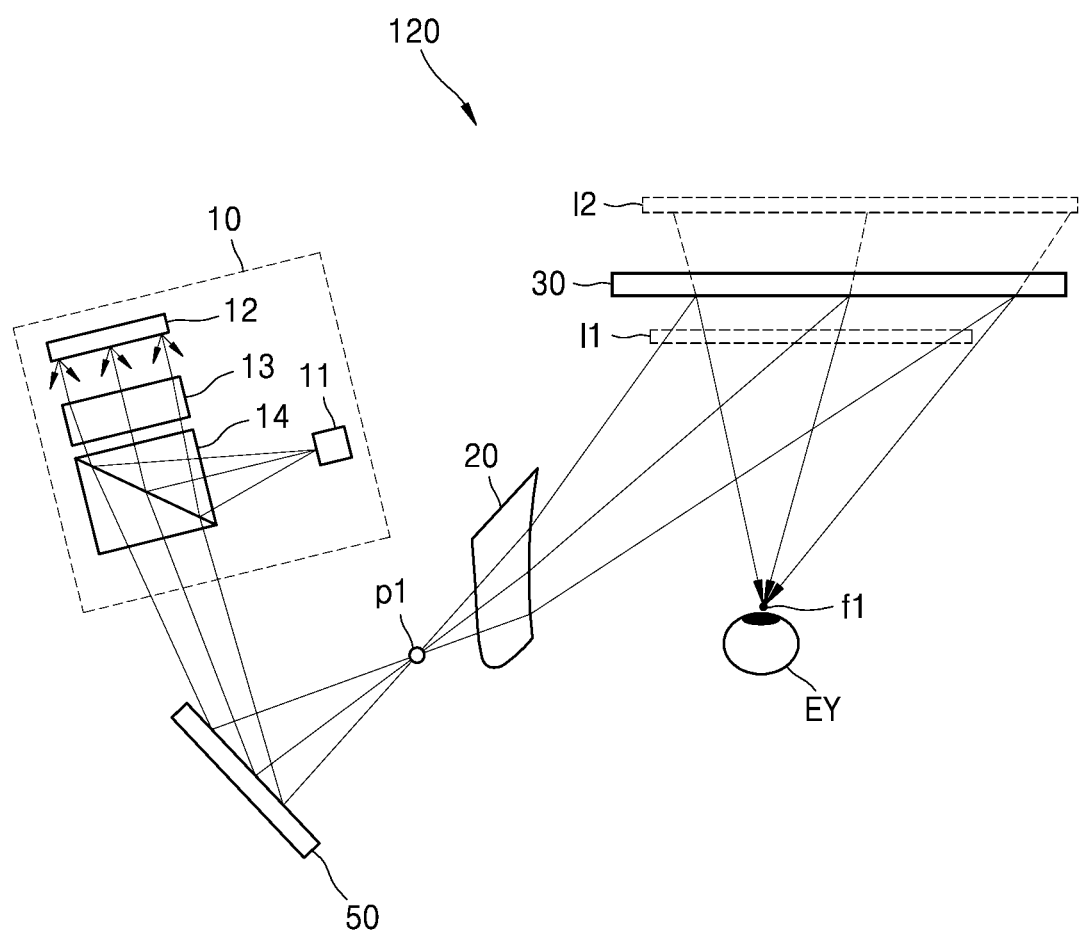
FIG. 5 is a diagram schematically illustrating an example configuration of a see-through display device, according to another example embodiment.

FIG. 5 is a diagram schematically illustrating an example configuration of a see-through display device 120, according to another example embodiment. The see-through display device 120 of FIG. 5 may be substantially the same as the see-through display device 100 of FIG. 2, except that the see-through display device 120 further includes a fixed mirror 50. In describing FIG. 5, descriptions that are provided in connection with FIG. 2 will be omitted.

Referring to FIG. 5, the see-through display device 120 may include the image generator 10 configured to emit image light, the combiner 30, which is arranged off-axis with respect to the image light and is configured to generate off-axis aberration with respect to the image light, and the free-form optical element 20, which is disposed on an optical path of the image light between the image generator 10 and the combiner 30 and is configured to generate a correction aberration opposite to the off-axis aberration with respect to the image light.

The see-through display device 120 may further include at least one fixed mirror 50 arranged between the image generator 10 and the combiner 30 to change the optical path of image light such that the image light from the image generator 10 travels toward the combiner 30. For example, the fixed mirror 50 may be disposed on the optical path of the image light between the image generator 10 and the free-form optical element 20. Accordingly, the image light from the image generator 10 may be reflected by the fixed mirror 50 to converge to the convergence point p1 and then may be diverged from the convergence point p1 to travel toward the free-form optical element 20. Although one fixed mirror 50 is illustrated in FIG. 5, a plurality of fixed mirrors 50 may be provided as necessary. In addition, the position of the fixed mirror 50 is not limited to that illustrated in FIG. 5, and the fixed mirror 50 may be disposed on the optical path of the image light that diverges from the convergence point p1. Furthermore, the fixed mirror 50 may be disposed on the optical path of the image light between the free-form optical element 20 and the combiner 30.

As described above, the optical path of image light may be variously changed by applying the fixed mirror 50 to the see-through display device 120, and accordingly, various configurations of the see-through display device 120 may be designed.

Figure 6:
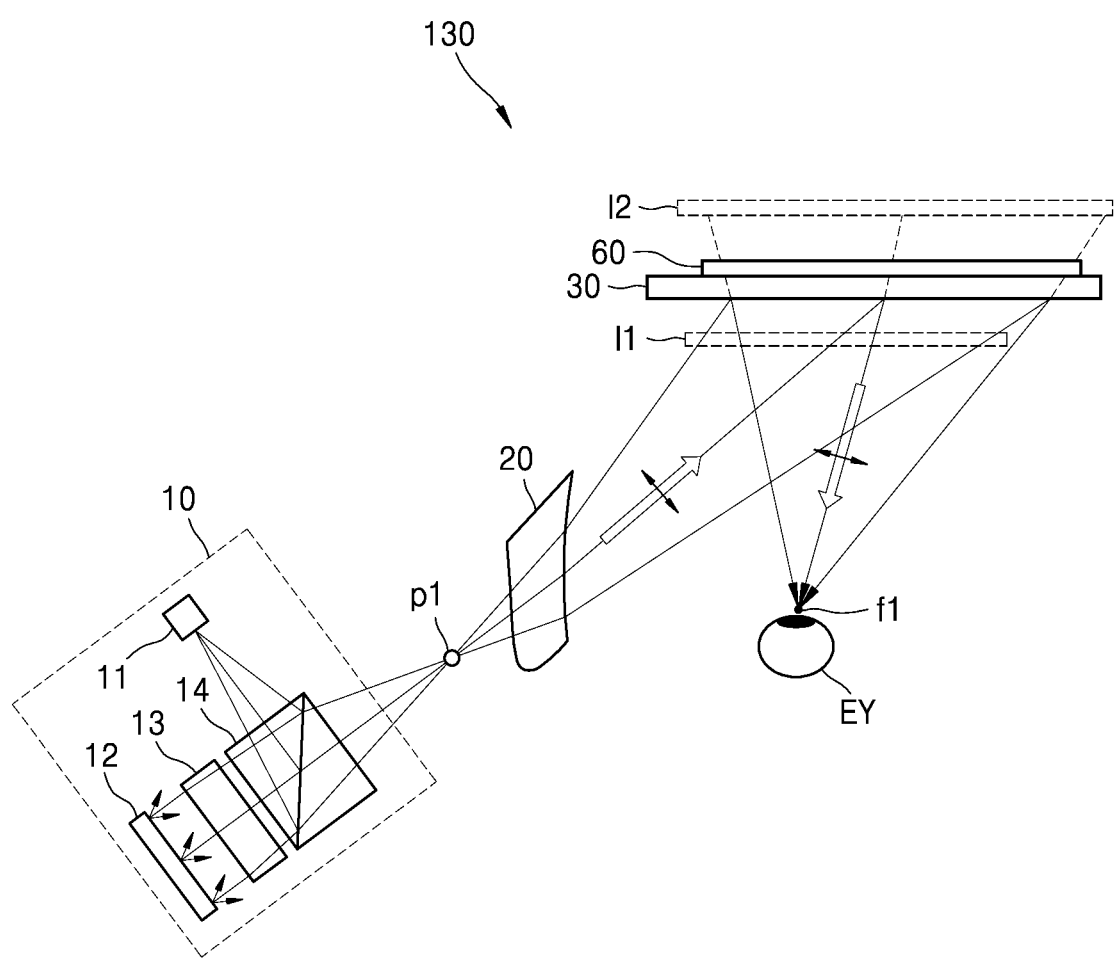
FIG. 6 is a diagram schematically illustrating an example configuration of a see-through display device, according to another example embodiment.

FIG. 6 is a diagram schematically illustrating an example configuration of a see-through display device 130 according to another example embodiment. The see-through display device 130 of FIG. 6 may be substantially the same as the see-through display device 100 of FIG. 2, except that the see-through display device 130 of FIG. 6 further includes a polarization plate 60. In describing FIG. 6, descriptions that are provided in connection with FIG. 2 will be omitted.

Referring to FIG. 6, the see-through display device 130 may include the image generator 10 configured to emit image light, the combiner 30, which is arranged off-axis with respect to the image light and is configured to generate an off-axis aberration with respect to the image light, and the free-form optical element 20, which is disposed on an optical path of the image light between the image generator 10 and the combiner 30 and is configured to generate a correction aberration opposite to the off-axis aberration with respect to the image light.

The see-through display device 130 may further include the polarization plate 60, which is disposed on the combiner 30 and is configured to reflect light of the first polarization and absorb or transmit light of a second polarization which is different from the first polarization. Here, the first polarization may be a horizontal polarization (P polarization), and the second polarization may be a vertical polarization (S polarization).

For example, image light, which has been emitted from the image generator 10, passed through the free-form optical element 20, and is traveling toward the combiner 30, may be light of the first polarization, for example, a horizontal polarization (P polarization). The image light may be diffracted and reflected by the combiner 30. In this process, a part of the image light, which is with a horizontal polarization (P polarization), may pass through the combiner 30. The polarization plate 60 may be disposed on the light exit surface of the combiner 30 from which the image light that passed through the combiner 30 is emitted. The part of the image light, which is with the horizontal polarization (P polarization) and has passed through the combiner 30, may not pass through the polarization plate 60. Accordingly, the image light of the horizontal polarization (P polarization) that passed through the combiner 30 may not leak out.

Figure 7:
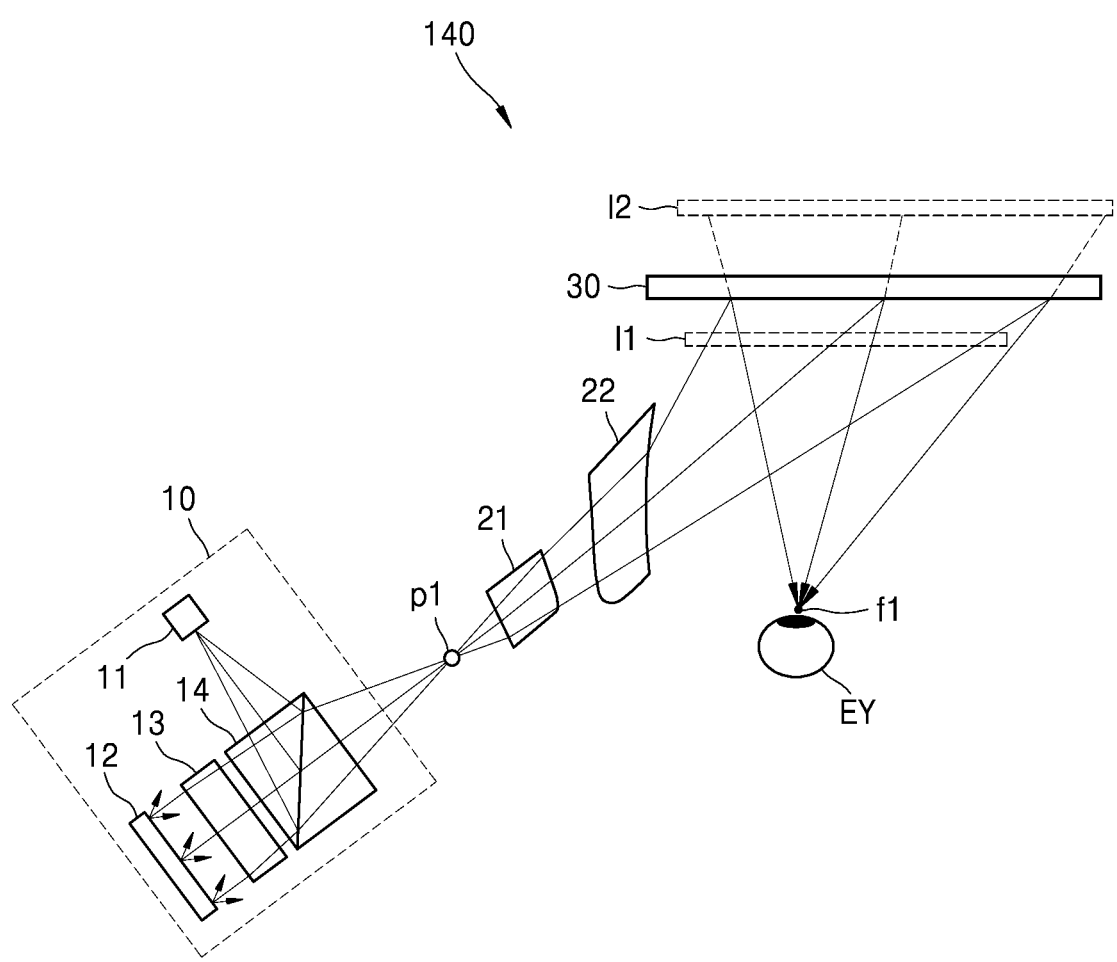
FIG. 7 is a diagram schematically illustrating an example configuration of a see-through display device, according to another example embodiment.

FIG. 7 is a diagram schematically illustrating an example configuration of a see-through display device 140, according to another example embodiment. The see-through display device 140 of FIG. 7 may be substantially the same as the see-through display device 100 of FIG. 2 except that the see-through display device 140 includes a first free-form optical element 21 and a second free-form optical element 22. In describing FIG. 7, descriptions that are provided in connection with FIG. 2 will be omitted.

Referring to FIG. 7, the see-through display device 140 may include the image generator 10 configured to emit image light, the combiner 30, which is arranged off-axis with respect to the image light and is configured to generate an off-axis aberration with respect to the image light, and the first free-form optical element 21 and the second free-form optical element 22 which are disposed on an optical path of the image light between the image generator 10 and the combiner 30 and is configured to generate a correction aberration opposite to the off-axis aberration with respect to the image light.

The see-through display device 140 may include the first free-form optical element 21 through which the image light from the image generator 10 passes and the second free-form optical element 22 through which the image light that passed through the first free-form optical element 21 passes. The correction aberration with respect to the image light may be generated by a combination of the first free-form optical element 21 and the second free-form optical element 22. The first free-form optical element 21 and the second free-form optical element 22 may be configured such that the correction aberration generated by the first free-form optical element 21 and the second free-form optical element 22 with respect to the image light offsets the off-axis aberration generated by the combiner 30 with respect to the image light. As illustrated in FIG. 7, the first free-form optical element 21 and the second free-form optical element 22 may be disposed on the optical path of the image light that diverges from the convergence point p1.

Each of the first free-form optical element 21 and the second free-form optical element 22 may include a curved surface represented by at least one coefficient of Legendre polynomials, extended polynomials, Chebyshev polynomials, Q-polynomials, and Zernike polynomials. The first free-form optical element 21 and the second free-form optical element 22 designed to have a curved surface represented by the coefficients of various polynomials may generate the correction aberration with respect to the image light and satisfy the Scheimpflug condition with respect to the combiner 30.

The curved surface of the first free-form optical element 21 and the curved surface of the second free-form optical element 22 may be designed to be different from each other. However, the disclosure is not limited thereto, and the curved surface of the first free-form optical element 21 and the curved surface of the second free-form optical element 22 may be designed to be the same.

Figure 8:
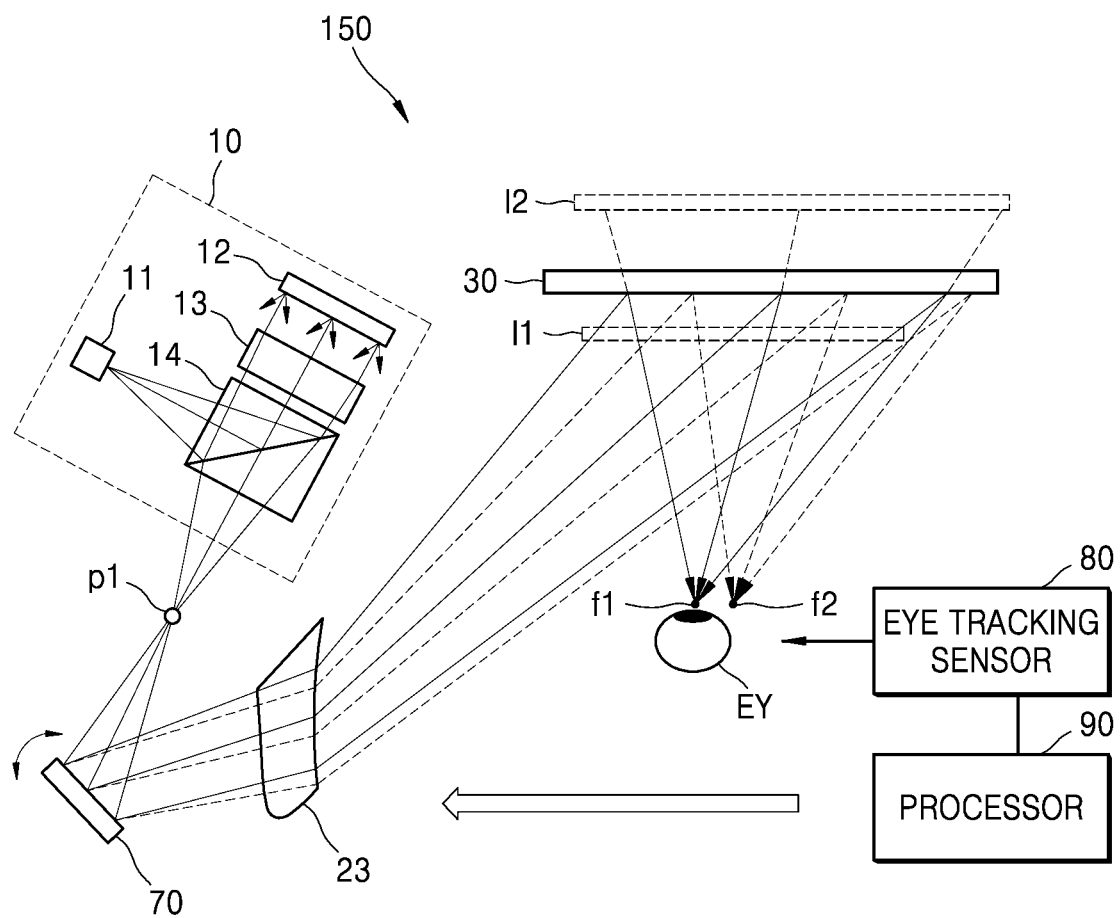
FIG. 8 is a diagram schematically illustrating an example configuration of a see-through display device, according to another example embodiment.
Figure 9:
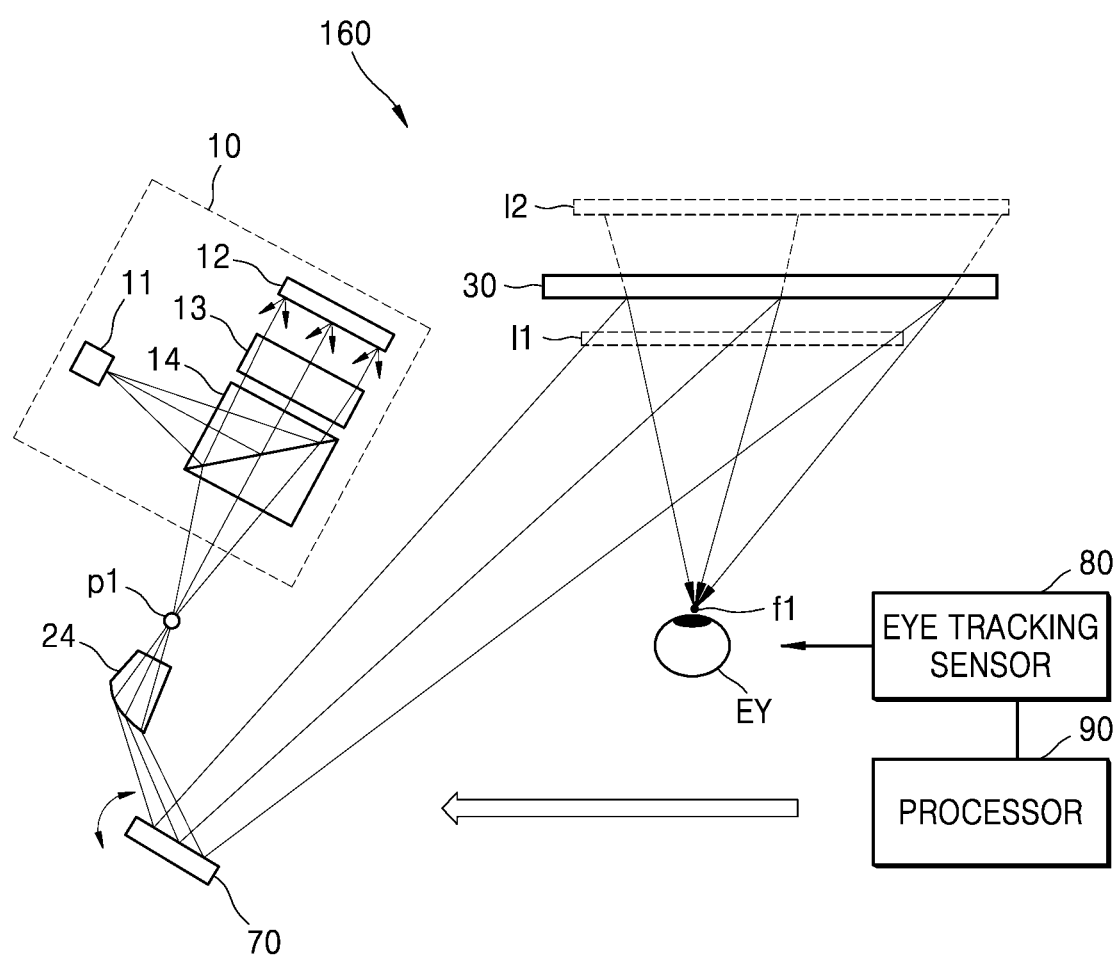
FIG. 9 is a diagram schematically illustrating an example configuration of a see-through display device, according to another example embodiment.

FIG. 8 is a diagram schematically illustrating an example configuration of a see-through display device 150, according to another example embodiment. FIG. 9 is a diagram schematically illustrating an example configuration of a see-through display device 160, according to another example embodiment.

The see-through display device 150 of FIG. 8 may be substantially the same as the see-through display device 100 of FIG. 2 except that the see-through display device 150 further includes a rotatable mirror 70 and an eye tracking sensor 80. The see-through display device 160 of FIG. 9 may be substantially the same as the see-through display device 150 of FIG. 8 except that the rotatable mirror 70 of the see-through display device 160 is disposed between a free-form optical element 24 and the combiner 30. In describing FIG. 8, descriptions that are provided in connection with FIG. 2 will be omitted. In describing FIG. 9, descriptions that are provided in connection with FIGS. 2 and 8 will be omitted.

Referring to FIG. 8, the see-through display device 150 may include the image generator 10 configured to emit image light, the combiner 30, which is arranged off-axis with respect to the image light and is configured to generate an off-axis aberration with respect to the image light, and a free-form optical element 23, which is disposed on an optical path of the image light between the image generator 10 and the combiner 30 and is configured to generate a correction aberration opposite to the off-axis aberration with respect to the image light.

The see-through display device 150 may further include the rotatable mirror 70, which is disposed between the image generator 10 and the combiner 30 and is configured to rotate to variously change the traveling direction of the image light from the image generator 10 to the combiner 30. The rotatable mirror 70 may be disposed on the optical path of the image light between the image generator 10 and the free-form optical element 23. For example, the rotatable mirror 70 may be disposed on the optical path of the image light that diverges from the convergence point p1. However, the disclosure is not limited thereto, and as illustrated in FIG. 9, the rotatable mirror 70 of the see-through display device 160 may be disposed on the optical path of the image light between the free-form optical element 24 and the combiner 30.

When the rotatable mirror 70 is in a first state, the image light may be finally focused on the first focal point f1 by the combiner 30. When the rotatable mirror 70 is in a second state in which the rotatable mirror 70 has rotated by a preset angle from the first state, the image light may be finally focused on a second focal point f2 different from the first focal point f1 by the combiner 30. As described above, by adjusting the rotation of the rotatable mirror 70, the eye box of the see-through display device 150 may be enlarged.

Meanwhile, the see-through display device 150 may further include the eye tracking sensor 80 configured to sense the position of the eye EY of the user and a processor 90 configured to control the rotation of the rotatable mirror 70 based on the position of the eye EY of the user sensed by the eye tracking sensor 80. When the eye tracking sensor 80 has sensed that the position of the eye EY of the user is at the first focal point f1, the processor 90 may control the rotation of the rotatable mirror 70 such that the image light may be focused on the first focal point f1 by the combiner 30. In addition, when the eye tracking sensor 80 has sensed that the position of the eye EY of the user is at the second focal point f2, the processor 90 may control the rotation of the rotatable mirror 70 such that the image light may be focused on the second focal point f2 by the combiner 30.

Figure 10:
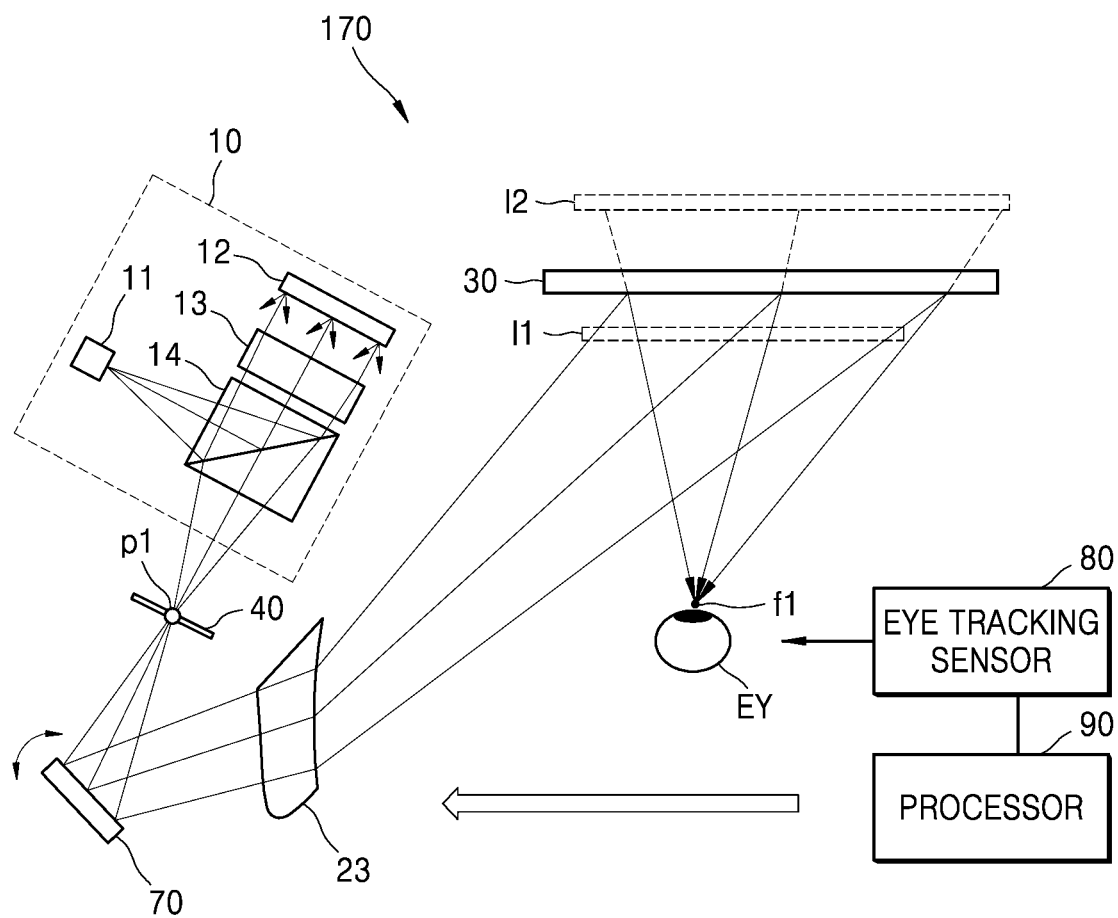
FIG. 10 is a diagram schematically illustrating an example configuration of a see-through display device, according to another example embodiment.
Figure 11:
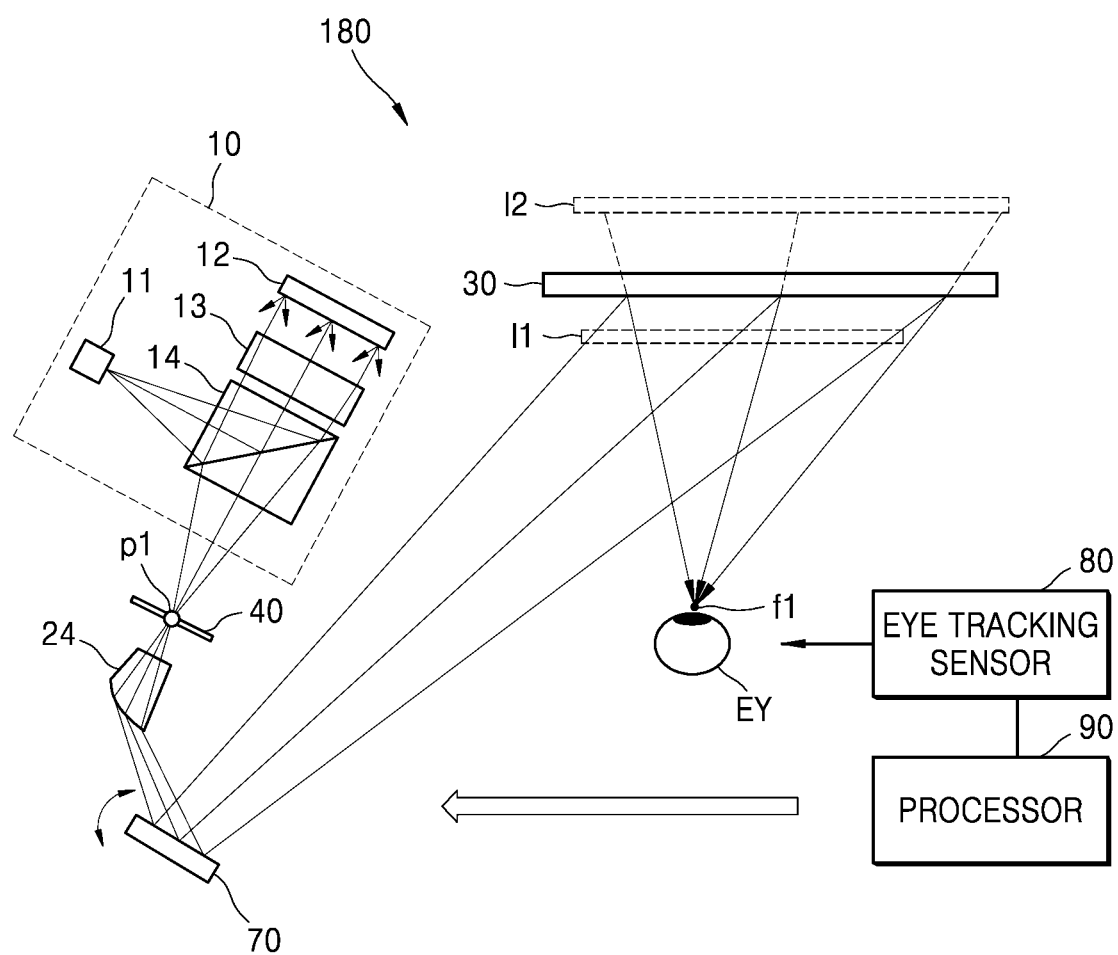
FIG. 11 is a diagram schematically illustrating an example configuration of a see-through display device, according to another example embodiment.

FIG. 10 is a diagram schematically illustrating an example configuration of a see-through display device 170, according to another example embodiment. FIG. 11 is a diagram schematically illustrating an example configuration of a see-through display device 180, according to another example embodiment.

The see-through display device 170 of FIG. 10 may be substantially the same as the see-through display device 150 of FIG. 8, except that the see-through display device 170 further includes the aperture 40. The see-through display device 180 of FIG. 11 may be substantially the same as the see-through display device 160 of FIG. 9 except that the see-through display device 180 further includes the aperture 40. In describing FIG. 10 and FIG. 11, descriptions that are provided in connection with FIGS. 2, 8, and 9 will be omitted.

Referring to FIGS. 10 and 11, the see-through display devices 170 and 180 may further include the aperture 40 at the convergence point p1 to filter image light. The aperture 40 may be configured to perform a spatial filtering function with respect to image light. For example, the aperture 40 may transmit image light converged to the convergence point p1 and may not transmit light corresponding to noise, which is not converged to the convergence point p1.

For example, as described with reference to FIG. 4, the aperture 40 may include the hole h1 formed at the center thereof. The aperture 40 may be configured to perform a spatial filtering function with respect to image light.

Figure 12:
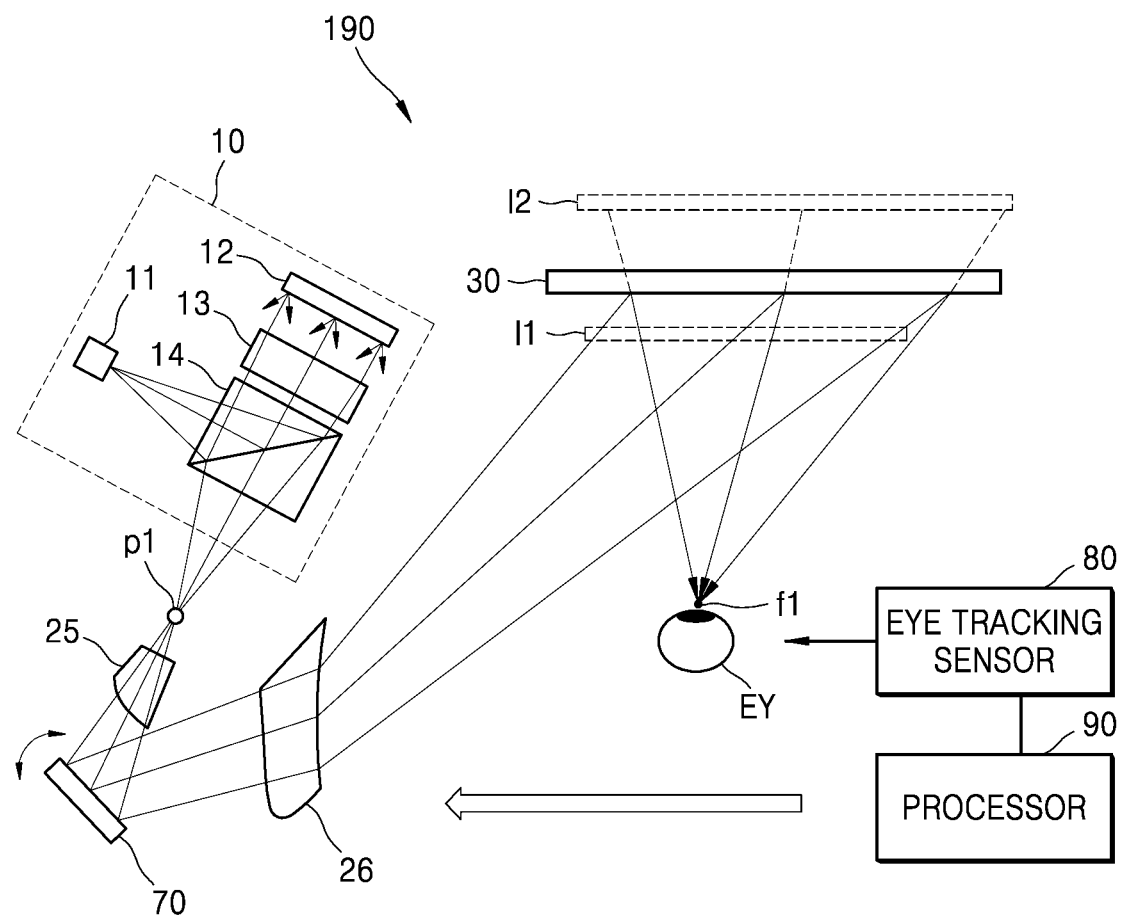
FIG. 12 is a diagram schematically illustrating an example configuration of a see-through display device, according to another example embodiment.
Figure 13:
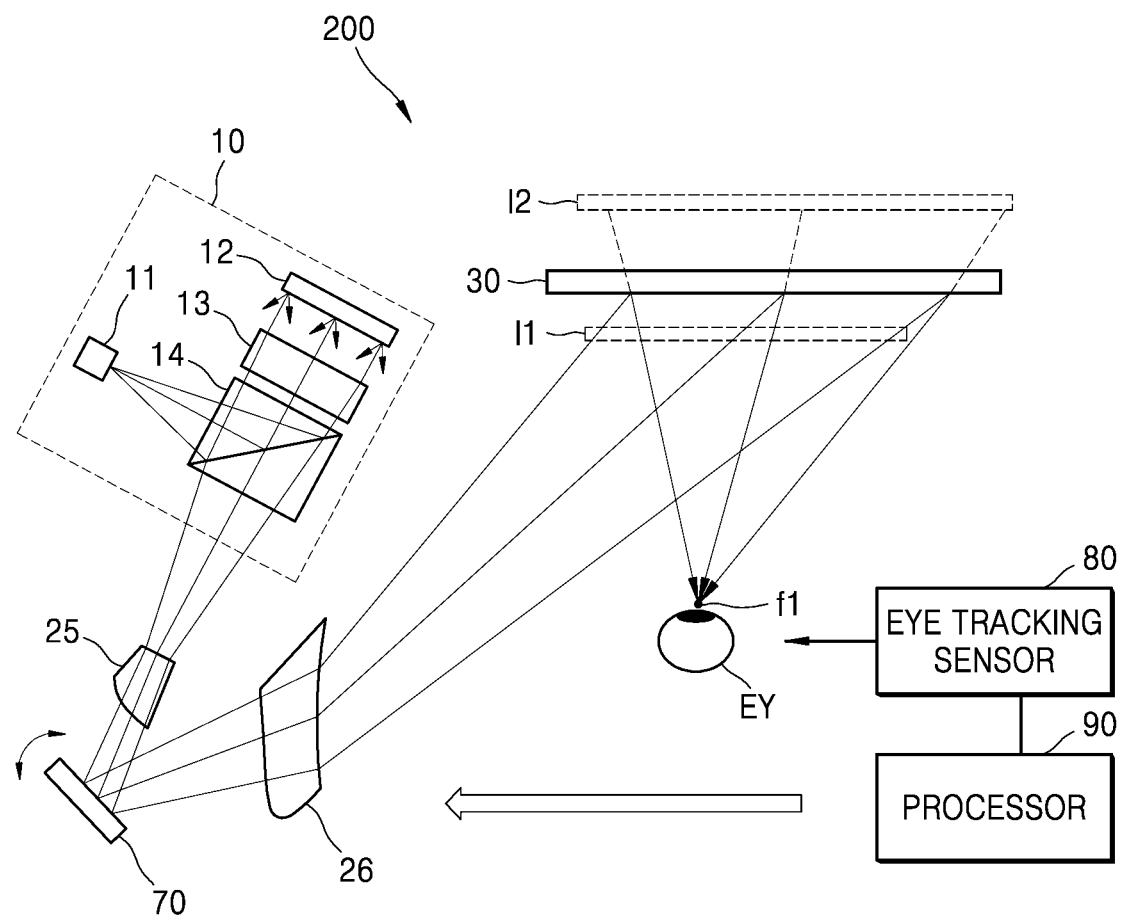
FIG. 13 is a diagram schematically illustrating an example configuration of a see-through display device, according to another example embodiment.

FIG. 12 is a diagram schematically illustrating an example configuration of a see-through display device 190, according to another example embodiment. FIG. 13 is a diagram schematically illustrating an example configuration of a see-through display device 200, according to another example embodiment.

The see-through display device 190 of FIG. 12 may be substantially the same as the see-through display device 150 of FIG. 8 except that the see-through display device 190 includes a first free-form optical element 25 and a second free-form optical element 26. In describing FIG. 12, descriptions that are provided in connection with FIGS. 2 and 8 will be omitted.

The see-through display device 200 of FIG. 13 may be substantially the same as the see-through display device 190 of FIG. 12, except that the position of the first free-form optical element 25 is determined to allow image light from the image generator 10 to be incident on the first free-form optical element 25 such that the image light does not converge to the convergence point p1. In describing FIG. 13, descriptions that are provided in connection with FIGS. 2, 8, and 12 will be omitted.

Referring to FIG. 12, the see-through display device 190 may include the first free-form optical element 25 through which image light from the image generator 10 passes and the second free-form optical element 26 through which the image light that passed through the first free-form optical element 25 passes. The correction aberration with respect to the image light may be generated by a combination of the first free-form optical element 25 and the second free-form optical element 26. The first free-form optical element 25 and the second free-form optical element 26 may be configured such that the correction aberration generated by the first free-form optical element 25 and the second free-form optical element 26 with respect to the image light offsets the off-axis aberration generated by the combiner 30 with respect to the image light.

As illustrated in FIG. 12, the first free-form optical element 25 and the second free-form optical element 26 may be disposed on the optical path of the image light that diverges from the convergence point p1. However, the disclosure is not limited thereto, and as illustrated in FIG. 13, the positions of the first free-form optical element 25 and the second free-form optical element 26 may be determined such that the image light that passed through the collimating lens 13 and the beam splitter 14 is incident on the first free-form optical element 25, without being converged to the convergence point p1.

The rotatable mirror 70 may be disposed on the travel path of the image light between the first free-form optical element 25 and the second free-form optical element 26. Accordingly, the image light that passed through the first free-form optical element 25 may be reflected by the rotatable mirror 70 and then travel toward the second free-form optical element 26.

Figure 14:
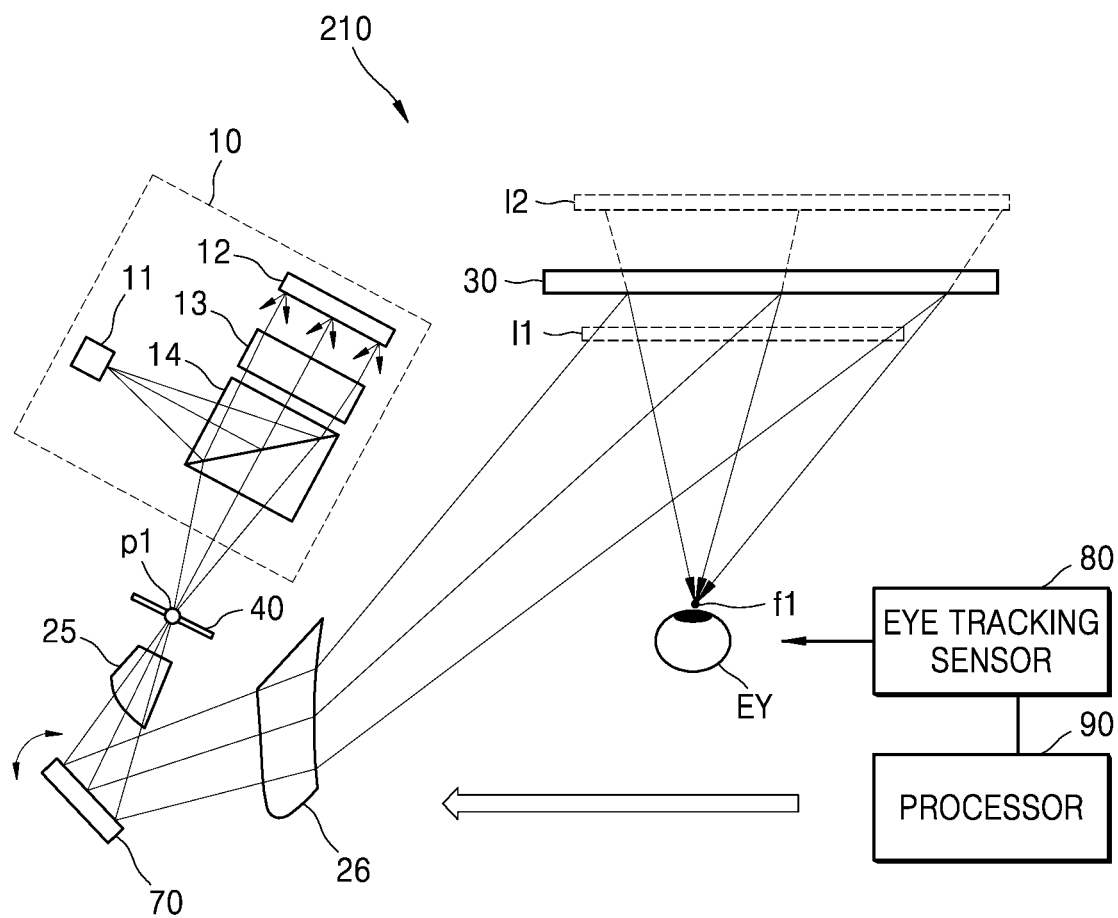
FIG. 14 is a diagram schematically illustrating an example configuration of a see-through display device, according to another example embodiment.

FIG. 14 is a diagram schematically illustrating an example configuration of a see-through display device 210, according to another example embodiment. The see-through display device 210 of FIG. 14 may be substantially the same as the see-through display device 190 of FIG. 12 except that the see-through display device 210 further includes the aperture 40. In describing FIG. 14, descriptions that are provided in connection with FIGS. 2, 8, and 12 will be omitted.

Referring to FIG. 14, the see-through display device 210 may further include the aperture 40 at the convergence point p1 to filter image light. The aperture 40 may be configured to perform a spatial filtering function with respect to image light. For example, the aperture 40 may transmit image light converged to the convergence point p1 and may not transmit light corresponding to noise, which is not converged to the convergence point p1.

For example, as described with reference to FIG. 4, the aperture 40 may include the hole h1 formed at the center thereof. The aperture 40 may be configured to perform a spatial filtering function with respect to image light.

Figure 15:
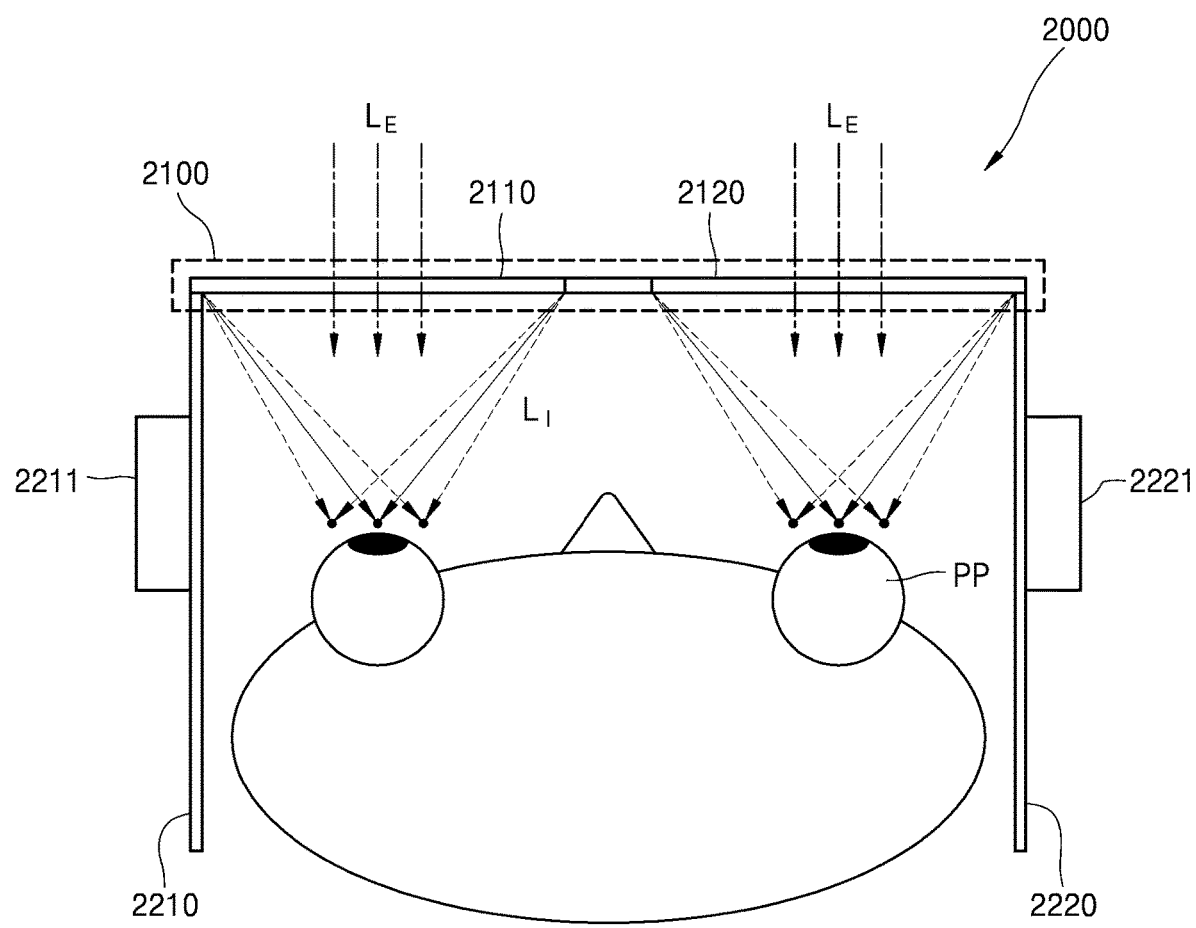
FIG. 15 is a diagram schematically illustrating an example configuration of an augmented reality device, according to an example embodiment.

FIG. 15 is a diagram schematically illustrating an example configuration of an augmented reality device 2000, according to an example embodiment.

Referring to FIG. 15, the augmented reality device 2000 may be implemented as a wearable device that may be worn on the body of a user. For example, the augmented reality device 2000 may be implemented as augmented reality glasses. In this case, the augmented reality device 2000 may include a body 2100 and leg parts 2210 and 2220 (hereinafter, also referred to as the first and second leg parts 2210 and 2220). In addition, the augmented reality device 2000 may include combiners 2110 and 2120 (hereinafter, also referred to as the first and second combiners 2110 and 2120) configured to couple external light $L_E$ with internal light $L_I$, and image generation devices 2211 and 2221 (hereinafter, also referred to as the first and second image generation devices 2211 and 2221) configured to generate the internal light $L_I$.

The body 2100 may be at a position corresponding to the front of eyes PP of a viewer. The leg parts 2210 and 2220 may be contact members for the user to wear the augmented reality device 2000 on the face of the user. The leg parts 2210 and 2220 may include the first leg part 2210 and the second leg part 2220 at both ends of the body 2100, respectively. The first leg part 2210 and the second leg part 2220 may correspond to the left- and right-side surfaces of the face of the user, respectively.

The combiners 2110 and 2120 configured to couple the external light $L_E$ with the internal light $L_I$ may be mounted on the front of the body 2100 facing the eyes PP of the viewer. The external light $L_E$ may pass through the combiners 2110 and 2120 to be provided to the eyes PP of the user. The internal light $L_I$ may be focused on the eyes PP of the user by the combiners 2110 and 2120. The combiners 2110 and 2120 may include the combiner 30 described with reference to FIGS. 1 to 14.

The combiners 2110 and 2120 may include the first combiner 2110 and the second combiner 2120 on a left front surface and a right front surface of the body 2100, respectively. The first combiner 2110 and the second combiner 2120 may face the eyes PP of the user. The first combiner 2110 and the second combiner 2120 may selectively focus, on a plurality of focal points near the eyes PP of the user, the internal light $L_I$ including an image provided from the image generation devices 2211 and 2221. Accordingly, an eye box of the augmented reality device 2000 may be enlarged.

The image generation devices 2211 and 2221 may be mounted on the leg parts 2210 and 2220, respectively. However, the disclosure is not limited thereto, and the image generation devices 2211 and 2221 may be mounted on the body 2100 according to a design. The image generation devices 2211 and 2221 may include the first image generation device 2211 and the second image generation device 2221 at the first leg part 2210 and the second leg part 2220, respectively.

The first image generation device 2211 may include a first image generator configured to emit image light, and a first free-form optical element, which is disposed on an optical path of the image light between the first image generator and the first combiner 2110. In addition, the second image generation device 2221 may include a second image generator configured to emit image light and a second free-form optical element, which is disposed on an optical path of the image light between the second image generator and the second combiner 2120. In this case, each of the first and second image generators respectively included in the first and second image generation devices 2211 and 2221 may include the image generator 10 described with reference to FIGS. 1 to 14. In addition, each of the first and second free-form optical elements respectively included in the first and second image generation devices 2211 and 2221 may include at least one of the free-form optical elements 20, 21, 22, 23, 24, 25, and 26 having various shapes and arrangements described with reference to FIGS. 1 to 14.

The first image generation device 2211 may provide the first combiner 2110 with the internal light $L_I$ including the image. Also, the second image generation device 2221 may provide the second combiner 2120 with the internal light $L_I$ including the image. The internal light $L_I$ provided to the first and second combiners 2110 and 2120 may be selectively focused on the plurality of focal points near the eyes PP of the user. For example, the first and second image generation devices 2211 and 2221 may further include the rotatable mirror 70 described with reference to FIGS. 5 and 8 to 14, and accordingly, the position on which the image light is focused by the first and second combiners 2110 and 2120 may vary.

The external light $L_E$ incident from the outside of the augmented reality device 2000 may pass through the combiners 2110 and 2120 to be provided to the eyes PP of the user. As described above, the external light $L_E$ and the internal light $L_I$ may be combined with each other and provided to the user.

According to various example embodiments of the disclosure, provided are a see-through display device including a configuration for minimizing an off-axis aberration that may be generated by a combiner and satisfying a Scheimpflug condition, and an augmented reality device including the see-through display device.

According to various example embodiments of the disclosure, by using a free-form optical element, an off-axis aberration that may be generated by the combiner included in the see-through display device may be minimized.

According to various example embodiments of the disclosure, a Scheimpflug condition with respect to the combiner included in the see-through display device may be satisfied by using the free-form optical element.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. A see-through display device comprising:
   an image generator configured to emit light corresponding to an image;
   a combiner arranged off-axis with respect to the light corresponding to the image; and
   a free-form optical element provided on an optical path of the light corresponding to the image between the image generator and the combiner, the free-form optical element configured to generate a correction aberration with respect to the light corresponding to the image, the correction aberration being opposite to an off-axis aberration generated by the combiner,
   wherein an intermediate image is generated between the combiner and a focal point of the combiner, and
   wherein the combiner is configured to output an enlarged virtual image corresponding to the intermediate image by focusing, on the focal point, light obtained by diffracting and then reflecting the light corresponding to the image that passed through the free-form optical element.

2. The see-through display device of claim 1, wherein the free-form optical element is further configured to generate the correction aberration to offset the off-axis aberration generated by the combiner.

3. The see-through display device of claim 1, wherein the free-form optical element comprises a curved surface represented by at least one coefficient of Legendre polynomials, extended polynomials, Chebyshev polynomials, Q-polynomials, and Zernike polynomials.

4. The see-through display device of claim 1, wherein the free-form optical element comprises:
   a first free-form optical element configured to pass through the light corresponding to the image from the image generator, and
   a second free-form optical element pass through the light corresponding to the image that passed through the first free-form optical element, and
   wherein the correction aberration is generated by a combination of the first free-form optical element and the second free-form optical element.

5. The see-through display device of claim 1, wherein the combiner comprises a holographic optical element (HOE), and is further configured to focus the light corresponding to the image.

6. The see-through display device of claim 1, wherein the combiner comprises a diffractive optical element (DOE), and is further configured to focus the light corresponding to the image.

7. The see-through display device of claim 1, wherein the image generator comprises a light source, a beam splitter configured to transmit a part of light from the light source and reflect another part of the light, a spatial light modulator configured to modulate the light emitted from the light source and reflected by the beam splitter to generate the light corresponding to the image, and a collimating lens which is disposed on an optical path, between the spatial light modulator and the beam splitter, of the light corresponding to the image from the spatial light modulator and is configured to convert the light emitted from the light source into parallel light.

8. The see-through display device of claim 7, wherein the collimating lens and the beam splitter are configured to converge the light corresponding to the image from the spatial light modulator to any one point.

9. The see-through display device of claim 8, further comprising an aperture which is at the one point to which the light corresponding to the image converges and is configured to filter the light corresponding to the image.

10. The see-through display device of claim 1, further comprising a rotatable mirror which is disposed between the image generator and the combiner and is configured to rotate to variously change a traveling direction of the light corresponding to the image from the image generator to the combiner.

11. The see-through display device of claim 10, wherein the rotatable mirror is disposed on an optical path of the light corresponding to the image between the image generator and the free-form optical element.

12. The see-through display device of claim 10, wherein the rotatable mirror is disposed on an optical path of the light corresponding to the image between the free-form optical element and the combiner.

13. The see-through display device of claim 10, wherein the free-form optical element comprises a first free-form optical element through which the light corresponding to the image from the image generator passes, and a second free-form optical element through which the light corresponding to the image that passed through the first free-form optical element passes,
   wherein the correction aberration is generated by a combination of the first free-form optical element and the second free-form optical element, and
   the rotatable mirror is disposed on an optical path of the light corresponding to the image between the first free-form optical element and the second free-form optical element.

14. The see-through display device of claim 1, further comprising at least one fixed mirror which is disposed between the image generator and the combiner and is configured to change an optical path of the light corresponding to the image such that the light corresponding to the image from the image generator travels toward the combiner.

15. The see-through display device of claim 1, further comprising a polarization plate which is disposed on the combiner and is configured to reflect light of a first polarization and absorb or transmit light of a second polarization which is different from the first polarization.

16. An augmented reality device comprising:
   a body;
   a first leg part provided at a left end of the body and a second leg part provided at a right end of the body;
   a first combiner provided at a left front surface and a second combiner provided at a right front surface of the body; and
   a first image generation device and a second image generation device configured to provide light corresponding to image to the first combiner and the second combiner, respectively,
   wherein each of the first image generation device and the second image generation device comprises:
   an image generator configured to emit the light corresponding to the image; and
   a free-form optical element provided on an optical path of the image light between the image generator and the first combiner or the second combiner,
   wherein the first combiner and the second combiner are arranged off-axis with respect to the light corresponding to the image, and
   wherein the free-form optical element is configured to generate a correction aberration with respect to the light corresponding to the image, the correction aberration being opposite to an off-axis aberration generated by the combiner,
   wherein an intermediate image is generated between one of the first combiner and the second combiner and a focal point of the one of the first combiner and the second combiner, and
   wherein the one of the first combiner and the second combiner is configured to output an enlarged virtual image corresponding to the intermediate image by focusing, on the focal point, light obtained by diffracting and then reflecting the light corresponding to the image that passed through the free-form optical element.

17. The augmented reality device of claim 16, wherein the free-form optical element is further configured to generate the correction aberration by the free-form optical element and the off-axis aberration generated by the first combiner and the second combiner offset.

18. The augmented reality device of claim 16, wherein the free-form optical element comprises a curved surface represented by at least one coefficient of Legendre polynomials, extended polynomials, Chebyshev polynomials, Q-polynomials, and Zernike polynomials.

* * * * *